(12) United States Patent
Fujita

(10) Patent No.: US 11,221,015 B2
(45) Date of Patent: Jan. 11, 2022

(54) BLOWER DEVICE

(71) Applicant: MINEBEA MITSUMI Inc., Nagano (JP)

(72) Inventor: Kazuhiko Fujita, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/970,664

(22) PCT Filed: Feb. 20, 2019

(86) PCT No.: PCT/JP2019/006306
§ 371 (c)(1),
(2) Date: Aug. 18, 2020

(87) PCT Pub. No.: WO2019/163820
PCT Pub. Date: Aug. 29, 2019

(65) Prior Publication Data
US 2020/0386238 A1 Dec. 10, 2020

(30) Foreign Application Priority Data
Feb. 22, 2018 (JP) .............................. JP2018-029523

(51) Int. Cl.
*F04D 29/42* (2006.01)
*F04D 29/28* (2006.01)

(52) U.S. Cl.
CPC ....... *F04D 29/281* (2013.01); *F04D 29/4226* (2013.01)

(58) Field of Classification Search
CPC .. F04D 29/281; F04D 29/4226; F04D 29/601; F04D 29/624; F04D 29/626
See application file for complete search history.

(56) References Cited

U.S. PATENT DOCUMENTS 2,808,981 A * 10/1957 Marion ................. F04D 29/626
248/188.8
3,407,993 A * 10/1968 Bostrom ............. F04D 29/4226
415/127

(Continued)

FOREIGN PATENT DOCUMENTS

CN 1716731 A 1/2006
CN 200989313 Y 12/2007

(Continued)

OTHER PUBLICATIONS

Chinese Office Action dated Jun. 18, 2021 for corresponding Chinese Application No. 201980014799.0 and English translation.

(Continued)

*Primary Examiner* — Ninh H. Nguyen
(74) *Attorney, Agent, or Firm* — Pearne & Gordon LLP

(57) ABSTRACT

It is possible to provide a blower device which can be attached to a target having various kinds of shapes at low cost. A blower device 1 including a blower casing 2 having a structure in which an impeller 7 is housed in a primary casing 5 and a secondary casing 6, and then the casings are assembled together, and fixing member 3 which is attached on an outer circumference of the blower casing 2 and which is to fix the blower device 1 to an attachment target, in which the fixing member 3 can be selectively attached among the attachment positions on the blower casing 2.

15 Claims, 6 Drawing Sheets

(56) References Cited

U.S. PATENT DOCUMENTS

| | | | | |
|---|---|---|---|---|
| 4,599,042 A | * | 7/1986 | Colliver | ............... F04D 29/424 |
| | | | | 415/204 |
| 4,913,621 A | * | 4/1990 | Reither | ............... F04D 29/4226 |
| | | | | 415/211.1 |
| 8,317,463 B2 | * | 11/2012 | Ye | ..................... F04D 29/601 |
| | | | | 415/126 |
| 10,309,406 B2 | | 6/2019 | Fujita | |
| 2013/0111721 A1 | | 5/2013 | Mahfoudh et al. | |

FOREIGN PATENT DOCUMENTS

| | | |
|---|---|---|
| CN | 203321860 U | 12/2013 |
| CN | 203770178 U | 8/2014 |
| JP | 60-171998 U | 11/1985 |
| JP | 09-126198 A | 5/1997 |
| JP | 2002-161894 A | 6/2002 |
| JP | 2013-104365 A | 5/2013 |

OTHER PUBLICATIONS

International Search Report for corresponding International Application No. PCT/JP2019/006306 dated May 28, 2019.
Written Opinion for corresponding International Application No. PCT/JP2019/006306 dated May 28, 2019.

\* cited by examiner

BLOWER DEVICE

TECHNICAL FIELD

The present invention relates to a blower device, and more particularly, relates to a blower device which has characteristic structures for fixing to an attachment target.

BACKGROUND ART

Blower devices using centrifugal fans are widely used for cooling, ventilation, air conditioning of home electrical appliances, office automation equipment and industrial equipment, and vehicle equipment, and the like. Conventionally, a blower device includes a motor, a fan connected to the motor via a rotation axis, a blower lower casing fixing the motor, and multiple fixing legs arranged on the blower lower casing, each having a through hole for a screw. The blower device has a structure which is fixed to an attachment surface by multiple fixing attaching legs attached on the blower lower casing.

Therefore, since the blower device is fixed by screwing on the attachment surface only by the fixing attaching legs arranged on the blower lower casing, it is possible to maintain the strength of a body and to reduce the number of parts and the number of assembly steps. Furthermore, a blower device is known in which the lower blower casing and the upper blower casing are coupled only by hooks, so that a portion such as a screw is unnecessary and assembly is simplified (see Patent Document 1).

Patent Document 1: Japanese Unexamined Patent Application Publication No. 2013-104365

In the blower device described in Patent Document 1, a fixing attaching leg to be fixed to an attachment target is formed integrally with a blower lower casing. In this structure, for example, when a position to be fixed to a base to be attached is changed, it is necessary to form a blower lower casing in which the position of the fixing attaching leg is changed. In this case, it is necessary to newly prepare a mold for molding the blower lower casing. However, changing the mold is undesirable because doing so increases manufacturing costs.

In view of the abovementioned circumstances, it is an object of the present invention to provide a blower device capable of low-cost attachment to objects having various shapes, such as equipment, devices, apparatus, and structures.

The present invention is a blower device including: a blower casing having a structure in which an impeller is housed in a primary casing and a secondary casing, and then the casings are assembled together, and a fixing member which is attached on an outer circumference of the blower casing and which is to be used to fix the blower device to an attachment target, in which there are multiple attachment positions which are alternatives for attaching the fixing member on the blower casing, and the fixing member can be selectively attached to the attachment positions.

In the present invention, an embodiment can be mentioned in which the fixing member, which is formed separately from the blower casing, and the blower casing are assembled by engagement of one or more of multiple projecting portions or one or more of multiple grooves formed on the blower casing extending in an axial direction and a groove or a projecting portion formed on the fixing member extending in an axial direction.

In the present invention, an embodiment can be mentioned in which the fixing member is fixed on the blower casing in an axial direction.

In the present invention, an embodiment can be mentioned in which the projecting portion or the groove extending in an axial direction is formed on the primary casing, the fixing member includes a boss protruding in an axial direction, and a through hole into which the boss penetrates is formed in the primary casing and the secondary casing.

In the present invention, an embodiment can be mentioned in which a top of the boss which penetrates the hole is deformed.

In the present invention, an embodiment can be mentioned in which the number of the projecting portions or the number of the grooves extending in an axial direction formed on the blower casing is greater than the number of the grooves or the number of the projecting portions extending in an axial direction arranged on the fixing member.

In the present invention, an embodiment can be mentioned in which a wiring fixing portion, which fixes a wiring of the blower device, is fixed using the projecting portion or the groove extending in an axial direction arranged on the blower casing which is not used for attachment of the fixing member.

In the present invention, an embodiment can be mentioned in which the primary casing and the secondary casing are assembled together by engaging a boss for casing assembly and a hole for casing assembly.

In the present invention, an embodiment can be mentioned in which in a condition in which the boss for casing assembly and the hole for casing assembly are engaged, a top of the boss for casing assembly which penetrates the hole for casing assembly is deformed.

In the present invention, an embodiment can be mentioned in which the blower casing and the fixing member are fixed by a fastening member for fixing.

In the present invention, an embodiment can be mentioned in which each of the primary casing and the secondary casing includes a latching mechanism, the primary casing and the secondary casing are assembled using the latching mechanism, and the fixing member is fixed to a projecting portion formed on the primary casing.

In the present invention, an embodiment can be mentioned in which the fixing member is fixed on the blower casing in a direction perpendicular to an axial direction.

In the present invention, an embodiment can be mentioned in which an inserting hole is formed in the fixing member, and the fixing member is fixed to the blower casing by inserting a retaining block in the inserting hole.

In the present invention, an embodiment can be mentioned in which the projecting portion of the blower casing includes a front end surface and a back end surface in an axial direction, and the fixing member and the retaining block contact the front end surface and the back end surface, respectively, so that movement of the fixing member in an axial direction is blocked.

In the present invention, an embodiment can be mentioned in which the projecting portion is a convex portion having an approximately T-shaped perpendicular cross section in an axial direction, and the groove is a concave portion which engages the convex portion having an approximately T-shaped cross section.

According to the present invention, there is provided a blower device which can be attached to an object having various shapes at low cost.

BEST MODE FOR CARRYING OUT THE INVENTION

1. First Embodiments (1) Structure of Blower Device

Figure 1:
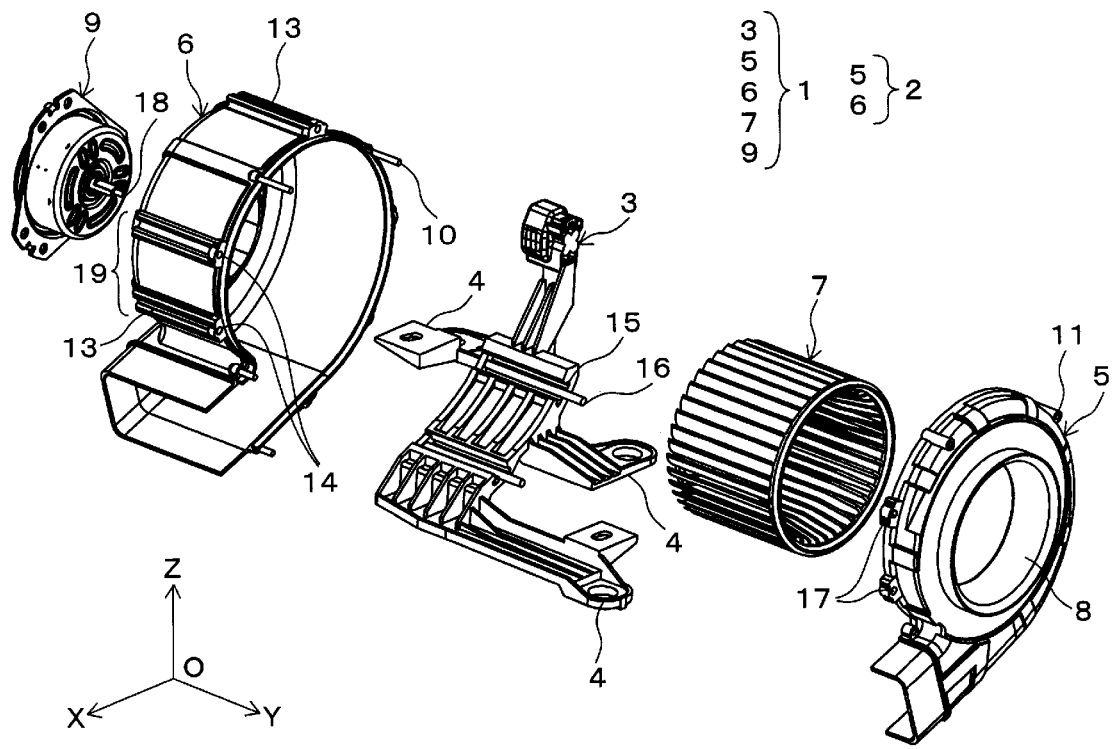
FIG. 1 is an exploded perspective view of a blower device of an embodiment.
Figure 2:
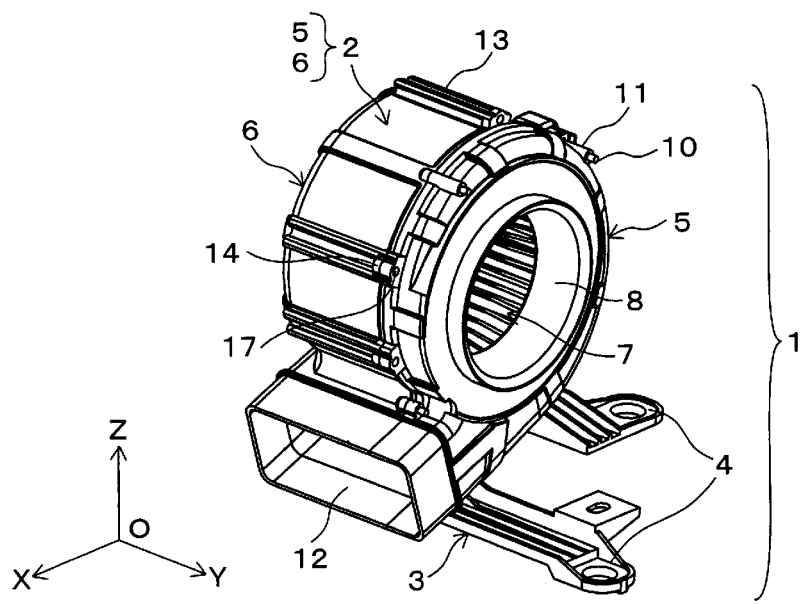
FIG. 2 is a perspective view in a case in which the exploded perspective view of the blower device of FIG. 1 is assembled.
Figure 3:
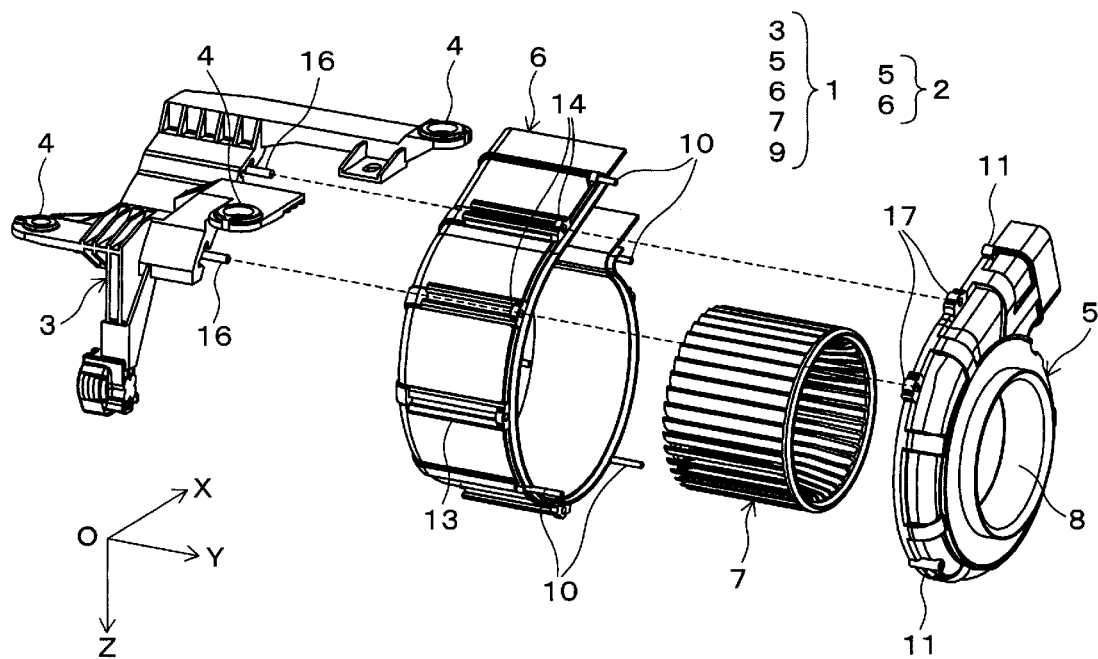
FIG. 3 is a view of which the exploded perspective view of the blower device of FIG. 1 is rotated 180 degrees around a Y-axis as a rotation axis.
Figure 4:
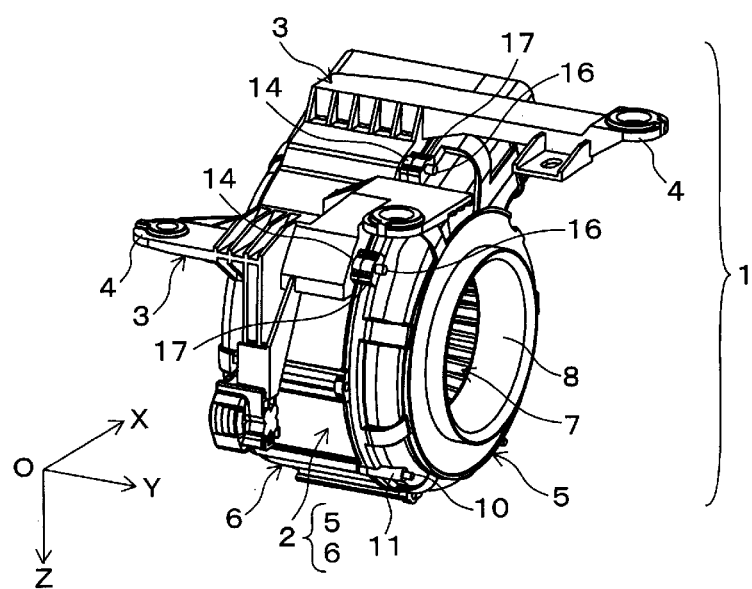
FIG. 4 is a perspective view in a case in which the exploded perspective view of the blower device of FIG. 3 is assembled.

FIG. 1 is an exploded perspective view of the blower device of the present embodiment. FIG. 2 is a perspective view in a case in which the exploded perspective view of the blower device of FIG. 1 is assembled. FIG. 3 is a view of which the exploded perspective view of the blower device of FIG. 1 is rotated 180 degrees around a Y-axis as a rotation axis. FIG. 4 is a perspective view in a case in which the exploded perspective view of the blower device of FIG. 3 is assembled. FIGS. 1 to 4 show the blower device 1 using a centrifugal fan of the present embodiment. A basic structure of the blower device 1 is similar to that disclosed in Patent Document 1, and the blower device 1 includes a blower casing 2 and a flange 3 which is a fixing member for fixing the blower casing 2 to an attachment target. Multiple fixing attaching legs 4, each having a through hole, are formed in the flange 3. The flange 3 can be attached to and detached from the blower casing 2. In this example, three fixing attaching legs 4 are arranged in the flange 3. The number of the fixing attaching legs 4 is not limited in particular, but it is at least one. Furthermore, a design of the fixing attaching leg 4 in the figure is one example, and it can be changed depending on shape or the like of an attachment target.

The blower casing 2 comprises of a blower upper casing 5 and a blower lower casing 6. An impeller 7, which is a blade portion of the centrifugal fan and which promotes blowing in and out of air, is housed between the blower upper casing 5 and the blower lower casing 6. The blower upper casing 5 includes an air inlet 8, and a motor 9 which is an electric motor rotating the impeller 7 is fixed to the blower lower casing 6. The blower upper casing 5 and the blower lower casing 6 are assembled by inserting a retaining boss 10 formed in the blower lower casing 6 into a retaining boss inserting hole 11 formed in the blower upper casing 5. In this assembled condition, the blower upper casing 5 and the blower lower casing 6 are engaged at an engaging surface thereof. It should be noted that an air outlet 12 (see FIG. 2) is formed by engaging the blower upper casing 5 and the blower lower casing 6.

In a condition in which the blower upper casing 5 and the blower lower casing 6 are assembled, the retaining boss 10 penetrates the retaining boss inserting hole 11, and a top thereof protrudes from the retaining boss inserting hole 11. By deforming this protruding portion by heat swaging, assembled strength of the blower upper casing 5 and the blower lower casing 6 is maintained. Here, the heat swaging means an operation in which a top of a boss inserted into a hole is deformed by heating and pressing, thereby fixing the boss to the hole, and it also means a structure obtained as a result of the operation. In this example, there are four retaining bosses 10 and four retaining boss inserting holes 11, but the numbers are not so limited.

At an outer circumferential part of the blower lower casing 6, multiple projecting portions 13 are formed to which the flange 3 engages by sliding in an axial direction. Here, the axial direction means a direction in which a rotation axis of the impeller 7 extends, and it corresponds to a Y-axis in the figure. The projecting portion 13 has a rail structure extending in an axial direction, and it has a cross sectional shape which can engage a groove 15 for sliding, as mentioned below, formed on the flange 3 in a slidable condition along an axial direction. In this example, viewed from an axial direction, the projecting portion 13 has a convex shape (approximately a T-shape) and the groove 15 for sliding has a concave shape (shape accommodating the approximately T-shape). By engaging each other, a structure is made in which they can slide in an axial direction, but cannot move relatively to each other along other directions. In addition, on upper part of the projecting portion 13, a concave portion is formed which extends in an axial direction and in which a boss 16, mentioned below, is housed.

At a top of a surface side of the projecting portion 13 engaging the blower upper casing 5, a flange boss inserting hole 14 is formed. On the other hand, in the flange 3, the groove 15 for sliding is formed on an inner circumference portion (surface of the blower casing 2 side), and the boss 16 is integrally formed at a position at which the groove 15 for sliding is formed. As mentioned above, the groove 15 for sliding engages the projecting portion 13 in a condition that is slidable in an axial direction, and while maintaining this condition, the boss 16 is contained in the concave portion at an upper part of the projecting portion 13. The number of grooves 15 for sliding, formed at an inner circumference of the flange 3, can be one; however, not less than two is desirable from the viewpoint of maintaining strength. The greater the number of grooves 15 for sliding that are formed, the stronger is the fixing to the blower casing 2.

According to the structure of the blower lower casing 6 and the flange 3 mentioned above, the projecting portion 13 formed at an outer circumference of the blower lower casing 6 and the groove 15 for sliding are engaged and slid, so as to fix the flange 3 on the blower lower casing 6. At this time, the boss 16 formed on the flange 3 is engaged and inserted in the flange boss inserting hole 14 formed in the blower lower casing 6 and a flange boss inserting hole 17 formed in the blower upper casing 5. As a result, a top of the boss 16 protrudes from the flange boss inserting hole 17. In addition, the top of the retaining boss 10 formed on the blower lower casing 6 protrudes from the retaining boss inserting hole 11 of the blower upper casing 5.

Then, the top of the retaining boss 10 protruding from the retaining boss inserting hole 11 of the blower upper casing 5 and the top of the boss 16 protruding from the flange boss inserting hole 17 of the blower upper casing 5 are heat-swaged so that the retaining boss 10 and the boss 16 are fixed to the blower upper casing 5. Here, another structure can be employed in which the top of the retaining boss 10 formed on the blower lower casing 6 and the top of the boss 16 formed on the flange 3 are divided into two after being inserted into the flange boss inserting hole 17 and fixed by engaging the inserting holes 11 and 17. Furthermore, fixation of the retaining boss 10 and the boss 16 to the inserting holes 11 and 17 can be performed by a method other than heat swaging, such as adhesion.

As mentioned above, the flange 3 is attached to the blower lower casing 6 and at the same time, the blower upper casing 5 and the blower lower casing 6 are assembled and fixed.

The motor 9 includes a shaft 18. The shaft 18 is a rotation axis of the motor 9, the axis which connects the impeller 7 and the motor 9. By this structure, the shaft 18 makes the impeller 8 rotate accompanied by rotation of the motor 9. Then, in the blower device 1, air is blown in from the air inlet 8 and blown out of the air outlet 12 by the rotation of the impeller 7.

The projecting portions 13 are formed on the outer circumference of the blower lower casing 6, and the number thereof is greater than the number of grooves 15 for sliding formed on the flange 3, so that multiple attaching positions of the flange 3 to the blower lower casing 6 can be selected. For example, in addition to an embodiment in which the flange 3 is fixed to the blower lower casing 6 in a positional relationship shown in FIG. 1, an embodiment is also possible in which the flange 3 is fixed to a position shown by reference numeral 19. In this case, the groove 15 for sliding engages the projecting portion 13 of the part indicated by the reference numeral 19. It should be noted that in this case, it is necessary that a shape of the flange 3 be changed so that it does not interfere with the blower lower casing 6 of the air outlet 12 part.

It is desirable that the number of the projecting portions 13 be as many as possible. This is because if many projecting portions 13 are formed on the outer circumference of the blower lower casing 6, there can be many variations of attachment position of the flange 3. For example, in a case in which the number of grooves 15 for sliding formed on the inner circumference of the flange 3 is two or more, a gap between the projecting portions 13 that are formed is set to be the same as a gap between the grooves 15 for sliding, and three or more projecting portions 13 are arranged. In this way, the flange 3 can be fixed to the blower lower casing 6 at not fewer than two positions. That is, alternative fixing positions of the flange 3 to the blower lower casing 6 are prepared at multiple positions along a circumferential direction of the blower lower casing 6. In that case, an attachment angle position around the axis of the flange 3 to the blower lower casing 6 can be selected from multiple alternatives.

It should be noted that the flange boss inserting hole 14 formed on the blower lower casing 6 and the flange boss inserting hole 17 formed on the blower upper casing 5 are formed so that each of them is positioned at a position corresponding to engagement of the blower upper casing 5 and the blower lower casing 6. In particular, the number of the flange boss inserting holes 17 formed on the blower upper casing 5 is not always limited to the same as the number of the projecting portions 13 of the blower lower casing 6 (or the number of the flange boss inserting holes 14 formed at the top of the projecting portion 13), but it is desirable that they be the same from the viewpoint of versatility during attaching the flange 3.

(2) Features During Production of Device

Standardization of the blower casing 2 (including the fan motor 9) can be realized by attaching the flange 3 later and by preparing multiple variations of the fixing positions. According to the standardization, only one production of a mold for production of the blower casing 2 is sufficient, and production cost can be greatly reduced. In addition, by reducing the number of times the mold needs to be produced, variation in properties of the blower device due to the mold can be minimized.

The flange 3 having the fixing attaching leg 4 is remade every time depending on a shape of an attachment surface. That is, in the present invention, by remaking only the flange 3, a blower device 1 is provided which can be adapted to an attachment surface of various shapes. Conventionally, depending on a shape of an attachment surface, the blower casing 2 (blower lower casing 6) and the flange 3 were remade. Compared to this, the present invention can reduce cost and time for production of the blower device 1.

(3) Features During Fixing Device

By appropriately selecting the multiple projecting portions 13 formed on the outer circumference of the blower lower casing 6, an attachment angle (angle position around the axis) of the fixing attaching leg 4 can be freely set. In addition, during engagement of the blower casing 2 and the flange 3, since the multiple engagement positions are set, the engagement condition is stronger.

That is, in this structure, assembly of the blower upper casing 5 and the blower lower casing 6 are performed by insertion of the retaining boss 10 into the retaining boss inserting hole 11, and heat swaging. In addition, by the engagement of the projecting portion 13 and the groove 15 for sliding, the flange 3 is assembled with the blower lower casing 6, and the flange 3 is fixed to the blower upper casing 5 by insertion of the boss 16 into the flange boss inserting hole 17, and heat swaging. That is, the assembly of the blower upper casing 5 and the blower lower casing 6 is performed via the flange 3, in addition to direct bonding of them. Therefore, the blower upper casing 5 and the blower lower casing 6 are mutually joined with a high fastening strength.

Modifications

The roles of the projecting portion 13 and the groove 15 can be the opposite. That is, a structure is possible in which a projecting portion extending in an axial direction is formed on the flange 3 side, and a groove engaging the projecting portion in an axial direction is arranged on the blower lower casing 6 side.

In addition, the roles of the retaining boss 10 and the retaining boss inserting hole 11 can be the opposite. That is, a structure is possible in which a hole is formed at the blower lower casing 6 side, and a boss inserted into the hole is formed at the blower upper casing 5 side.

Although it is omitted in the figure, a wire is drawn from the motor 9, and this wire is connected to a motor driving circuit (not shown). During installation of the blower device 1, it is necessary to be careful of wiring. The projecting portion 13 can be used in attachment of a wiring fixing jig which fixes this wire. In this case, the above wiring fixing jig is fixed to the projecting portion 13, which is not used for fixing of the flange 3, and the wire is fixed to this wiring fixing jig. The attachment of the wiring fixing jig to the projecting portion 13 is performed by arranging a groove similar to the groove 15 for sliding is formed on the wiring fixing jig, and engaging this groove and the projecting portion 13 in an axial direction. It should be noted that, also in this example, an embodiment is possible in which the relationship of the projecting portion and the groove is the opposite.

2. Second Embodiment (1) Features and Structure of the Blower Device

Figure 5:
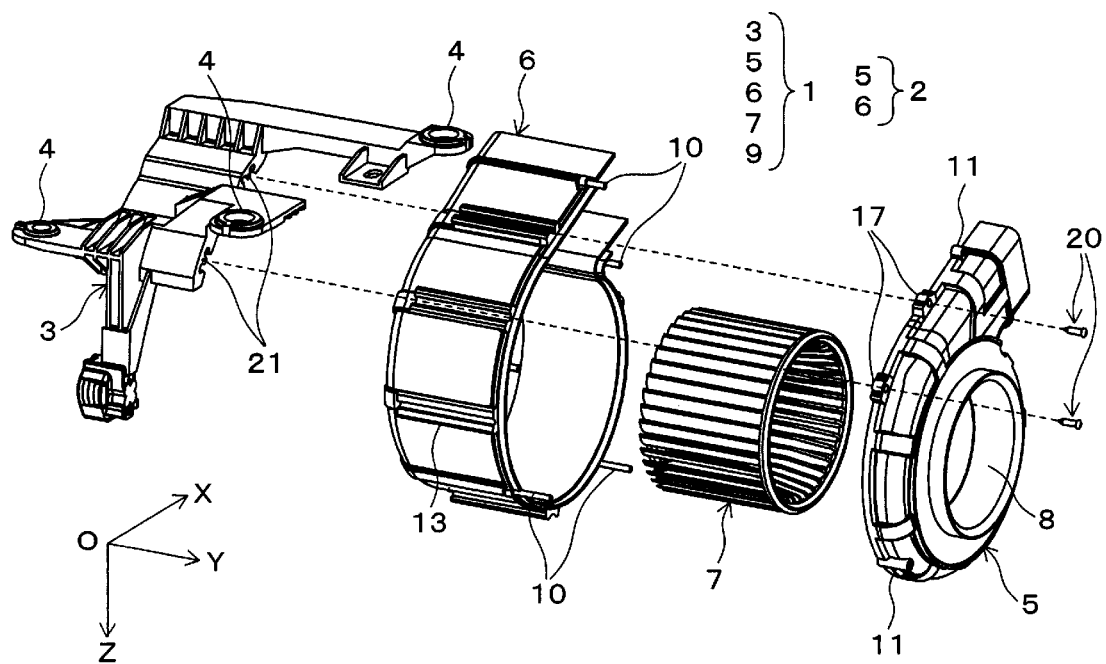
FIG. 5 is an exploded perspective view of a blower device of another embodiment.

FIG. 5 is an exploded perspective view of the blower device of the present embodiment. In the blower device 1 of the first embodiment shown in FIG. 3, as a structure in which the flange 3 is fixed to the blower lower casing 6, the boss 16 for fixing the flange is arranged on the flange 3, is inserted in the flange boss inserting hole 14 of the blower lower casing 6 and the flange boss inserting hole 17 of the blower upper casing 5, and the top or the boss 16 is deformed by the heat swaging so as to be fixed. On the other hand, in the blower device 1 of the embodiment shown in FIG. 5, a tapping screw 20 is used as a fastening member instead of the boss 16. Therefore, the blower lower casing 6, with or without the flange boss inserting hole 14, can be selected. It should be noted that in a case in which the blower lower casing 6 includes the flange boss inserting hole 14 or a similar hole portion, further greater strengthening of the assembly can be accomplished by employing a structure into which the tapping screw 20 is inserted. Then, the flange 3 does not include the boss 16 and includes a fastening portion 21 (or a fastening position) into which a top of the tapping screw 20 is screwed so as to fasten. For example, a lower hole into which the tapping screw 20 is screwed is formed at the fastening portion 21, and by screwing the tapping screw 20 which is inserted in the flange boss inserting hole 17 therein, the blower upper casing 5, the blower lower casing 6, and the flange 3 are unified.

Therefore, the tapping screw 20 is inserted in the flange boss inserting hole 17 of the blower upper casing 5 and fastened to the fastening portion 21 of an end surface of the fixing attaching leg 4 of the flange 3, thereby the blower lower casing 6 is fixed to the flange 3 in the present embodiment. In a case of the present embodiment, since the tapping screw 20 fastens, binding strength can be increased compared to the first embodiment in which the boss 16 fixes. It should be noted that other parts of the structure are the same as the blower device 1 shown in FIG. 3. It should be noted that as a fastening member, a generally used bolt, screw, divided pin or the like can be used instead of the tapping screw.

3. Modifications of First Embodiment and Second Embodiment

In the blower device 1 shown in the first embodiment and the second embodiment, the retaining boss 10 formed on the blower lower casing 6 is inserted into the retaining boss inserting hole 11 formed in the blower upper casing 5 and the top of the retaining boss 10 protruding from the retaining boss inserting hole 11 of the blower upper casing 5 is deformed by heat swaging or the like, so that the blower upper casing 5 and the blower lower casing 6 are assembled; however, instead of the retaining boss 10, for example, an embodiment can be mentioned in which a latching mechanism including a latching claw such as a snap fit is integrally formed the blower upper casing 5 and the latching claw latches and is assembled with the blower lower casing 6.

In addition, instead of the embodiment mentioned above, an embodiment can be mentioned in which the blower upper casing 5 and the blower lower casing 6 are assembled by the latching mechanism such as the snap fit and the flange 3 including the fixing attaching leg 4 is fixed to the projecting portion 13 formed on the outer circumference of the blower lower casing 6 by the retaining boss 16 or the tapping screw 20. In practice, the latching mechanism including the latching claw, being a convex portion such as a snap fit, is integrally formed with the blower upper casing 5, the latching mechanism including a concave portion engaging the latching claw is integrally formed with the blower lower casing 6, and the latching claw and the concave portion are engaged so as to assemble together the blower upper casing 5 and the blower lower casing 6. An embodiment can be mentioned in which the retaining boss 10 is formed on the flange 3 having the fixing attaching leg 4, the retaining boss 10 is inserted into a through hole formed in the projecting portion 13 formed on the outer circumference of the blower lower casing 6, and the top of the retaining boss 10 protruding from the through hole is deformed so as to fix. Alternatively, an embodiment can be mentioned, instead of the retaining boss 10, in which a through hole is formed in the flange 3 including the fixing attaching leg 4, and the tapping screw 20 is inserted into the through hole formed in the projecting portion 13 formed on outer circumference of the blower lower casing 6 and into the through hole formed in the flange 3, so as to fasten and fix. It should be noted that each engaging surface of the blower upper casing 5 and the blower lower casing 6 is an engagement of a concave portion and a convex portion.

Figure 6:
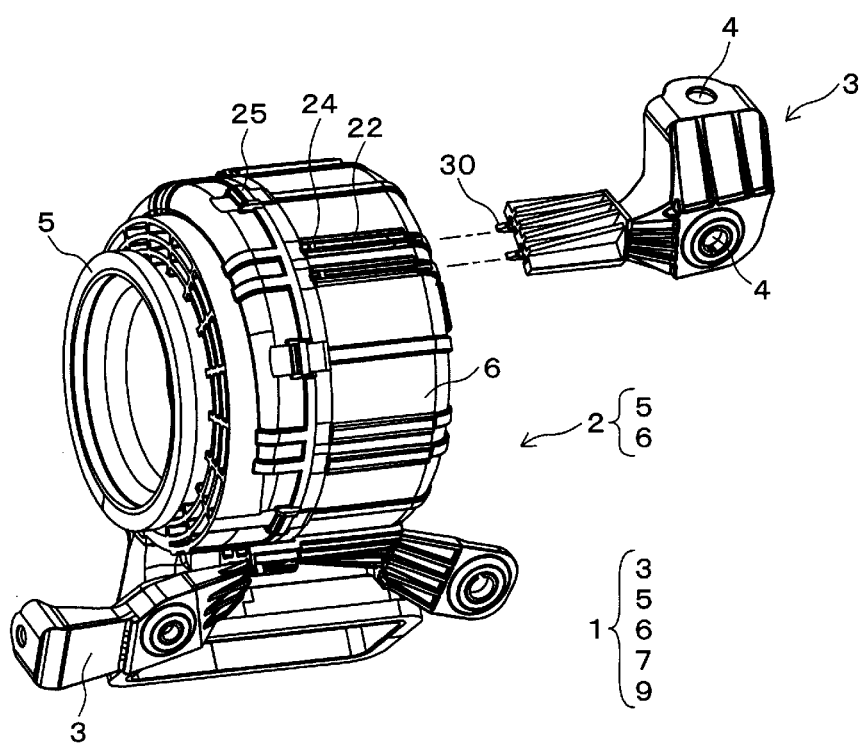
FIG. 6 is a perspective view in a condition before attaching a flange to the blower device of another embodiment.
Figure 7:
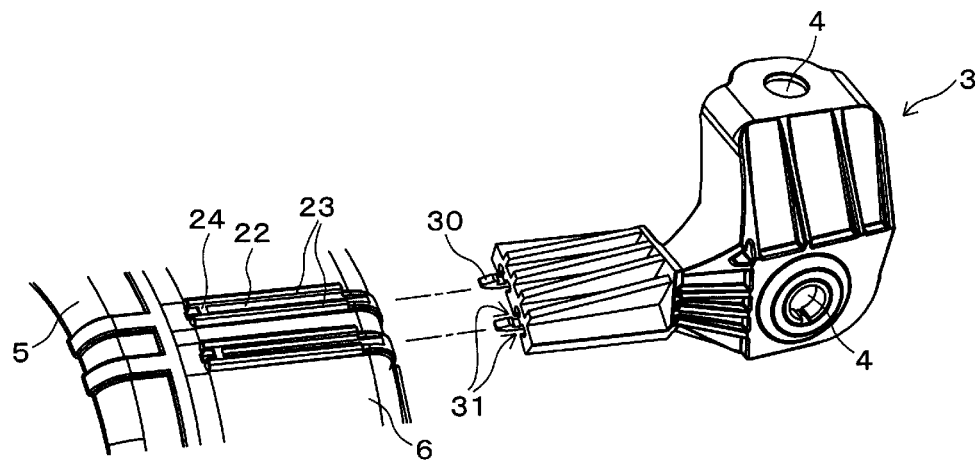
FIG. 7 is a partially enlarged view of the blower device shown in FIG. 6.
Figure 8:
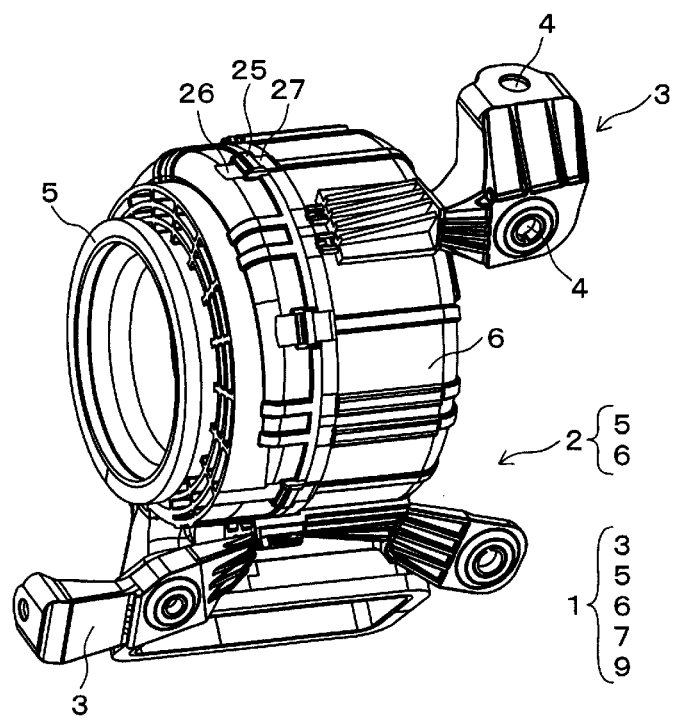
FIG. 8 is a perspective view in a condition in which the flange is attached to the blower device shown in FIG. 6.

Furthermore, instead of fixing of the casing and the flange 3 by the tapping screw 20, a structure shown in FIGS. 6 to 8 can be mentioned. In the structures of FIGS. 6 to 8, a latching claw 30 is integrally formed with a top of the flange 3 having the fixing attaching leg 4, concave portions 31 are formed on a lower surface of the flange 3 into which the projecting portion formed on the blower lower casing 6 engages, and the latching claw 30 is formed on the top of the projecting portion formed between the concave portions 31. Projecting portions 23 are formed on the blower lower casing 6, a concave portion (groove) 22 is formed between the projecting portions 23, and a bridge portion 24, which connects the two projecting portions 23, is formed at one end side (blower upper casing 5 side) of the concave portion (groove) 22. Then, the latching claw 30 is inserted into the concave portion (groove) 22 between the projecting portions formed on the blower lower casing 6, the projecting portions 23 formed on the blower lower casing 6 are engaged with the concave portions 31 formed on the lower surface of the flange 3 and then are slid, the latching claw 30 passes under the bridge portion 24, and the latching claw 30 engages the bridge portion 24, so that the flange 3 including the fixing attaching leg 4 is attached and fixed to the blower lower casing 6. The blower upper casing 5 and the blower lower casing 6 are assembled as follows: a latching mechanism 26 including a latching claw being a convex portion such as a snap fit 25 is integrally formed with the blower upper casing 5, a latching mechanism 27 including a concave portion engaging the latching claw of the latching mechanism 26 is integrally formed with the blower lower casing 6, and the latching claw and the concave portion are engaged.

4. Third Embodiment (1) Structures and Features of Blower Device

Figure 9:
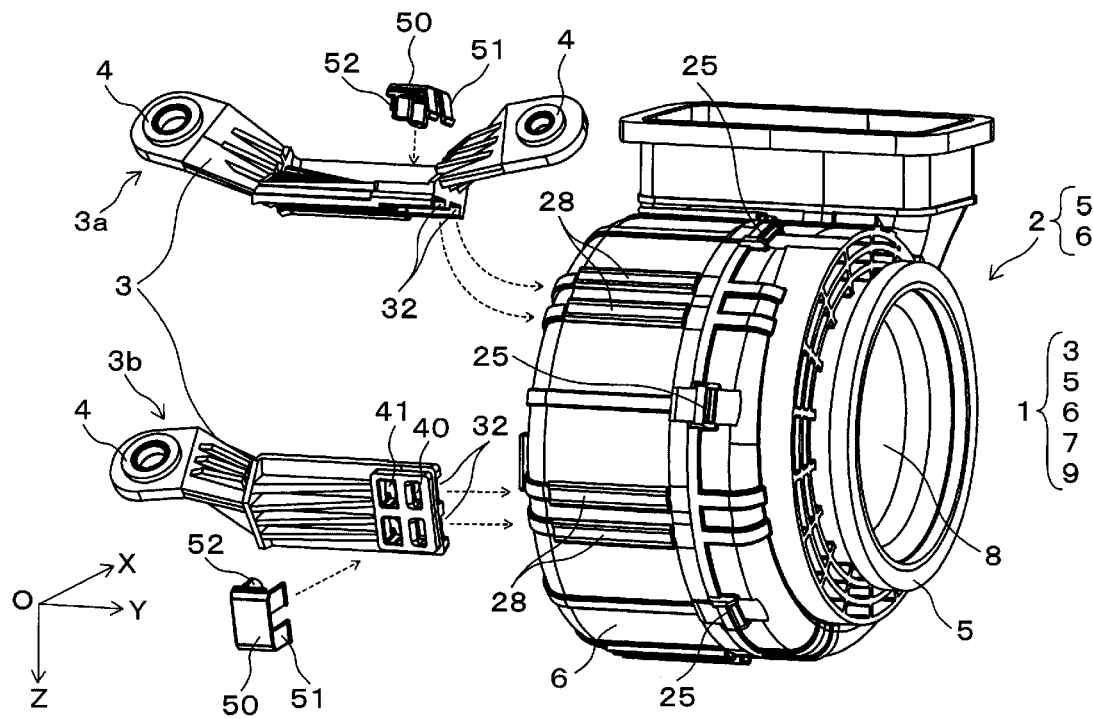
FIG. 9 is a perspective view of a blower device of another embodiment.
Figure 10:
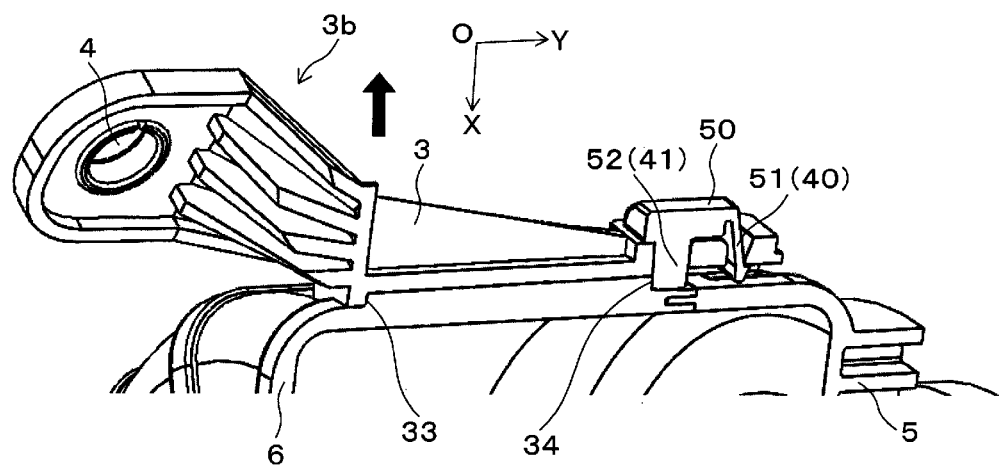
FIG. 10 is a cross sectional view in a condition in which the flange is attached to the blower device shown in FIG. 9.

FIG. 9 is a perspective view of the blower device of the present embodiment. In the blower device 1 of the third embodiment shown in FIG. 9, the abovementioned snap fit 25 is used as a fastening member of the blower lower casing 6 and the blower upper casing 5. Although the number of the snap fits 25 is not limited, it is desirable to arrange them multiply along a circumference of the blower casing. The number is appropriately selected in view of fastening strength and cost. It should be noted that each engaging surface of the blower upper casing 5 and the blower lower casing 6 is an engagement of a concave portion and a convex portion, as shown in FIG. 10.

Multiple pairs of two-line rail shaped projecting portions 28 are formed on an outer circumferential surface of the blower lower casing 6. Among these pairs of projecting portions 28, a pair of projecting portions 28 corresponding to a specific position is selected depending on necessity, and the projecting portions 28 are slid into the grooves 32 of the flange 3 and are then attached. In FIG. 9, although a case in which a flange 3a and a flange 3b are attached on the blower lower casing 6 is shown, the present invention is not limited only to this embodiment, and position and number of the flanges 3 may be selected depending on conditions of attaching the blower device.

Figure 12:
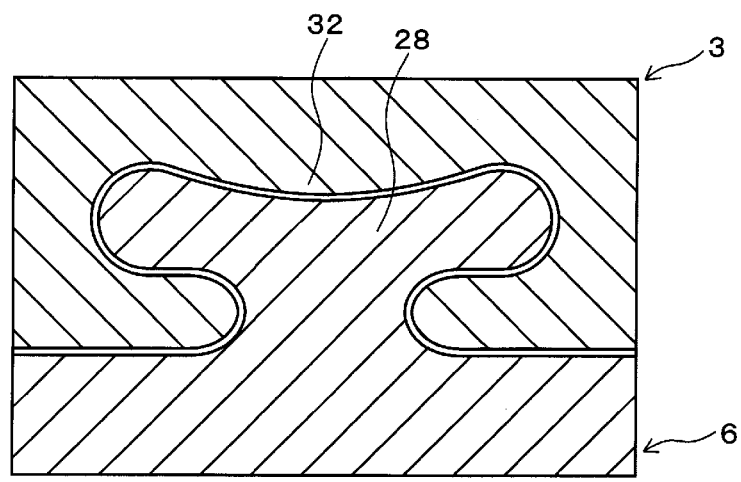
FIG. 12 is a cross sectional view schematically showing an assembled condition of a blower lower casing and the flange in the blower device shown in FIG. 9.

At this time, as shown in a cross sectional view of FIG. 12, one of the projecting portions 28 of the blower lower casing 6 side has a cross section of convex shape that is approximately a T-shape, and the one of the grooves 32 for sliding in the flange 3 side is formed to be concave so as to receive the approximately T-shape of the projecting portion 28. By this engagement, movement of the flange 3 from the blower lower casing 6 to a direction shown by the bold arrow in FIG. 7 is blocked, and the flange is prevented from falling off the blower lower casing 6.

The projecting portion 28 and the groove 32 are formed so as to tightly fit; however, in a case in which the projecting portion 28 and the groove 32 engages loosely, depending on size accuracy of a member by resin forming, multiple small ribs (projections) can be formed along an axial direction (Y-direction) on one of an outer circumferential surface of the projecting portion 28 or an inner circumferential surface of the groove 32. In this case, when sliding and attaching the flange 3, since the ribs (projections) are plastically deformed, the projecting portion 28 and the groove 32 can be fitted more tightly, and loosening of the flange 3 when attaching can be avoided.

FIG. 10 is a cross section showing an attachment condition of the flange 3b, which is one of the two flanges 3 in FIG. 9. By the flange 3b contacting a back end surface 33 of the projecting portion 28 of the blower lower casing 6, movement of the flange 3b to a Y-axis direction (blower upper casing 5 side) is blocked, thereby functioning as a stopper.

Figure 11:
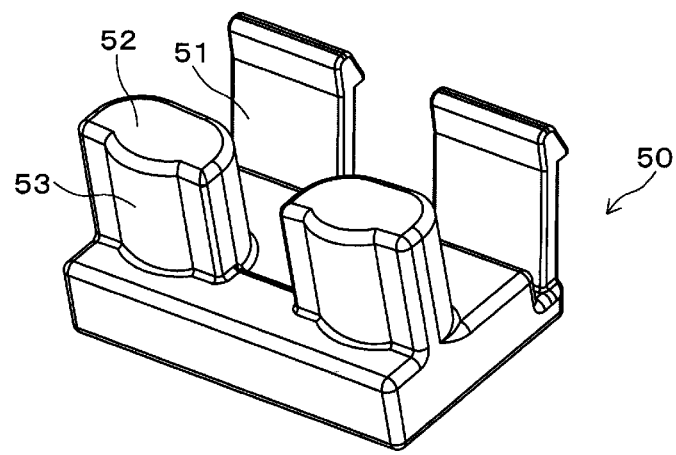
FIG. 11 is a perspective view of a retaining block of the flange shown in FIG. 9.

The flange 3 which is slid and attached to the projecting portions 28 of the blower lower casing 6 is fixed in a direction perpendicular to an axial direction by a retaining block 50. As shown in FIG. 11, the retaining block 50 includes two latching claws 51 and two foot portions 52. In addition, a side surface of each of the foot portions 52 includes a semicircular shape projecting portion 53. As shown in FIG. 9, the latching claws 51 and the foot portions 52 of the retaining block 50 are inserted into latching claw inserting holes 40 and foot portion inserting holes 41 formed in the flange 3, respectively.

In a case in which the foot portions 52 on which the semicircular projecting portion 53 is formed are inserted into two foot portion inserting holes 41 of the flange 3, they are attached in conditions such that the projecting portion 53 is pressed to an inner circumferential surface of the inserting hole 41 and a step portion of the blower lower casing 6. In addition, in a case in which the latching claws 51 are inserted into two latching claw inserting holes 40, the latching claw 51 latches an end portion of the inserting hole 40. In this way, the flange 3 can be prevented from falling off the blower lower casing 6. Furthermore, since the projecting portion 53 of the foot portion 52 contacts a front end surface 34 of the projecting portion 28 of the blower lower casing 6, it functions as a stopper in which movement of the flange 3 to a direction opposite to a Y-axis (blower lower casing 6 side) is blocked.

As explained, in the first and second embodiments, although the flange, which is a fixing member, is fixed in an axial direction on the projecting portion formed on the outer circumference of the blower lower casing by the retaining boss 10 or the tapping screw 20; in the third embodiment, the flange, which is a fixing member, is fixed in a direction perpendicular to an axial direction on the projecting portion formed on the outer circumference of the blower lower casing by the retaining block 50. It should be noted that a structure of the retaining block 50 is not limited to the embodiment, so long as the flange, which is a fixing member, is fixed in a direction perpendicular to an axial direction.

EXPLANATION OF REFERENCE NUMERALS

1: Blower device, 2: blower casing, 3: flange, 4: fixing attaching leg, 5: blower upper casing, 6: blower lower casing, 7: impeller, 8: air inlet, 9: motor, 10: retaining boss (for blower casing assembling), 11: retaining boss inserting hole, 12: air outlet, 13: projecting portion, 14: flange boss inserting hole (formed on blower lower casing), 15: groove for sliding, 16: boss (for flange fixation), 17: flange boss inserting hole (formed on blower upper casing), 18: shaft, 19: fixing position, 20: tapping screw, 21: fastening portion, 22: concave portion (groove), 23: projecting portion, 24: bridge portion, 25: snap fit, 26: latching mechanism of the snap fit, 27: latching mechanism of the snap fit, 28: projecting portion, 30: latching claw, 31: concave portion, 32: groove for sliding, 33: back end surface of the projecting portion, 34: front end surface of the projecting portion, 40: latching claw inserting hole, 41: foot portion inserting hole, 50: retaining block, 51: latching claw, 52: foot portion, 53: projecting portion.

The invention claimed is:

1. A blower device comprising:
   a blower casing having a structure in which an impeller is housed in a primary casing and a secondary casing, and then the casings are assembled together, and
   a fixing member which is attached on an outer circumference of the blower casing and which is to fix the blower device to an attachment target,
   wherein there are multiple attachment positions which are alternatives for attaching the fixing member on the blower casing, and the fixing member can be selectively attached at the attachment positions, and
   the fixing member which is formed separately from the blower casing and the blower casing are assembled by engagement of one or more of multiple projecting portions or one or more of multiple grooves formed on the blower casing extending in an axial direction and a groove or a projecting portion formed on the fixing member extending in the axial direction.

2. The blower device according to claim 1, wherein the fixing member is fixed on the blower casing in the axial direction.

3. The blower device according to claim 2, wherein the projecting portion or the groove extending in the axial direction is formed on the primary casing,
   the fixing member includes a boss protruding in the axial direction, and a through hole into which the boss penetrates is formed in the primary casing and the secondary casing.

4. The blower device according to claim 3, wherein a top of the boss which penetrates the hole is deformed.

5. The blower device according to claim 2, wherein the number of the projecting portions or the number of the grooves extending in the axial direction formed on the blower casing is greater than the number of the grooves or the number of the projecting portions extending in the axial direction arranged on the fixing member.

6. The blower device according to claim 5, wherein a wiring fixing portion which fixes a wiring of the blower device is fixed using the projecting portion or the groove extending in the axial direction arranged on the blower casing which is not used for attachment of the fixing member.

7. The blower device according to claim 1, wherein the primary casing and the secondary casing are assembled by engaging a boss for casing assembly and a hole for casing assembly.

8. The blower device according to claim 7, wherein in a condition in which the boss for casing assembly and the hole for casing assembly are engaged, a top of the boss for casing assembly which penetrates the hole for casing assembly is deformed.

9. The blower device according to claim 2, wherein the blower casing and the fixing member are fixed by a fastening member for fixing.

10. The blower device according to claim 2, wherein each of the primary casing and the secondary casing includes a latching mechanism, the primary casing and the secondary casing are assembled by the latching mechanism, and
the fixing member is fixed to a projecting portion formed on the primary casing.

11. The blower device according to claim 1, wherein the fixing member is fixed on the blower casing in a direction perpendicular to the axial direction.

12. The blower device according to claim 11, wherein an inserting hole is formed in the fixing member, and
the fixing member is fixed to the blower casing by inserting a retaining block in the inserting hole.

13. The blower device according to claim 12, wherein the projecting portion of the blower casing includes a front end surface and a back end surface in the axial direction, and
the fixing member and the retaining block contact the front end surface and the back end surface, respectively, so that movement of the fixing member in the axial direction is blocked.

14. The blower device according to claim 11, wherein the projecting portion is a convex portion having an approximately T-shaped perpendicular cross section in the axial direction, and
the groove is a concave portion which engages the convex portion having an approximately T-shaped cross section.

15. The blower device according to claim 11, wherein each of the primary casing and the secondary casing includes a latching mechanism, the primary casing and the secondary casing are assembled by the latching mechanism, and
the fixing member is fixed to a projecting portion formed on the primary casing.

* * * * *